United States Patent [19]  
Stoll et al.

[11] Patent Number: 4,941,642  
[45] Date of Patent: Jul. 17, 1990

[54] MOLD CONSTRUCTION COMPRISING A PLURALITY OF MOLD PORTIONS

[76] Inventors: Kurt Stoll, Lenzhalde 72, 7300 Esslingen, Fed. Rep. of Germany; Hans H. Glättli, Seestr. 252, CH-Küsnacht, Switzerland

[21] Appl. No.: 253,263
[22] Filed: Oct. 4, 1988

[30] Foreign Application Priority Data

Oct. 9, 1987 [DE] Fed. Rep. of Germany ....... 3734118

[51] Int. Cl.⁵ .............................................. B29C 39/26
[52] U.S. Cl. ..................................... 249/122; 249/124; 249/151; 249/160; 249/177
[58] Field of Search ............... 249/122, 151, 144, 146, 249/147, 160, 161, 124, 125, 147, 149, 175, 177, 176, 184; 425/4 R, 817 R, 5 R, 588; 299/176, 161, 184

[56] References Cited

U.S. PATENT DOCUMENTS

| | | | |
|---|---|---|---|
| 1,124,237 | 1/1915 | Torrey | 249/151 |
| 2,392,804 | 1/1946 | Basolo | 264/227 |
| 2,684,502 | 7/1954 | Paulve | 425/577 |
| 3,424,089 | 1/1969 | Humpherson | 425/577 |
| 3,503,095 | 3/1970 | Uhlig | 425/577 |
| 3,537,676 | 11/1970 | Miller | 425/577 |
| 3,737,277 | 6/1975 | Uhlig | 425/577 |
| 3,754,846 | 8/1973 | Choate | 425/577 |
| 4,154,786 | 5/1979 | Plasse | 264/46.9 |
| 4,159,099 | 6/1979 | Maguire | 249/93 |
| 4,208,368 | 6/1980 | Egli | 264/51 |
| 4,519,569 | 5/1985 | Nolan | 425/577 |
| 4,524,943 | 6/1985 | Busch et al. | 425/577 |
| 4,531,702 | 7/1985 | Plummer | 425/577 |
| 4,732,726 | 3/1988 | Grannen | 425/577 |

FOREIGN PATENT DOCUMENTS

| | | | |
|---|---|---|---|
| 0070763 | 1/1983 | European Pat. Off. | 425/577 |
| 1559371 | 3/1969 | France | 425/577 |
| 0158232 | 9/1983 | Japan | 425/577 |
| 336337 | 10/1930 | United Kingdom | 249/151 |
| 669819 | 4/1952 | United Kingdom | 425/577 |

Primary Examiner—Willard Hoag
Attorney, Agent, or Firm—McGlew & Tuttle

[57] ABSTRACT

The invention relates to a negative mold containing a plurality of mold portions which can be detached from each other. It functions in particular for the manufacture of shapes consisting of plastic. The two mold halves enclose a molding chamber receiving the material to be shaped. In the chamber is arranged at least one insert abutting at least one projection which together form the negative for a surface depression to be produced in the shape. On the insert a fastening shank is arranged with the transition region being located in the region of the associated mold portion surface and being formed as gradation. Thereby the insert in contact with the mold half covers completely the orifice of the opening containing the shank and, in addition, projects beyond the opening edge.

16 Claims, 3 Drawing Sheets

MOLD CONSTRUCTION COMPRISING A PLURALITY OF MOLD PORTIONS

BACKGROUND OF THE INVENTION

Field of the Invention

The invention relates in general to negative molds and in particular to a negative mold of two or more mold portions which are detachable from each other for the manufacture of shapes consisting of synthetic material for adapter blocks, used in particular in fluid technology. The negative mold encloses a mold chamber receiving the material to be molded into which at least one projection representing the negative for a surface depression to be produced in the adapter shape, for example a channel or a chamber or similar, projects with its mold insert which is arranged on one of the mold portions above its fastening shank which is inserted into an opening of the mold portion.

In the field of pneumatics pneumatic circuits are no longer produced through individual hose connections, which make clear overview difficult, but by using so-called adapter blocks. These have possibilities for connecting several pressure users and/or sources or similar, and they contain interior channels extending according to needed connections. For simplified manufacture of the interior channels the adapter blocks are customarily put together consisting of at least two structural parts which are glued together, of which at least one consists of a plastic and has in the region of the glued surface, depression covered by the other part. The depressions form the channels once they are glued. The manufacture of the adapter shapes having the surface depressions takes place, for example in a plastic injection molding process or by introducing a foamable material into the mold chamber and expanding by foaming and curing, forming a structured shape.

Such negative mold and a corresponding method are known from DEP 31 24 020. Here the inserts used for sparing the surface depressions are formed in the shape of cylindrical molding pins which are held in corresponding openings of the individual mold portions. It is of disadvantage here that during the casting, respectively foaming, process frequently a given quantity of the material to be cast, respectively foamed, in the region of the outer circumference of the insert penetrates into the opening of the particular mold portion receiving the shank. The material is deposited in the orifice region of the opening and forms a collar firmly connected with the manufactured adapter shape which cannot be removed even when the shape is removed from the negative mold. Consequently, after the casting, respectively foaming, process further processing steps are required to remove the cast collar respectively mold mark and to ensure in the subsequent finished state proper throughflow and, hence, proper functioning of the adapter block.

SUMMARY OF THE INVENTION

The invention provides a negative mold according to the initially mentioned kind in which the creation of disturbing cast molding marks in the region of the produced surface depressions is prevented so that subsequent cost-intensive processing steps can be dispensed with.

The mold has a transition region located between the mold insert and the fastening shank in the region of the surface of the mold portions pointing toward the mold chamber and formed as a gradation, widening from the shank toward the insert in such a way that the insert in contact with the mold portion completely covers the orifice of the recess or opening containing the shank and, in the process, additionally projects above the edge of the recess respectively overlaps it. Compared to the known inserts equipped in the region of the shank and the mold part with identical exterior contour and identical external dimensions the inserts of the negative mold according to the invention, have a graded shape. The shank is thinner than the insert, hence, the recess or opening of the mold portion receiving the shank is simultaneously provided with a lesser widths than the insert. Thus, while according to prior art the diameter of the opening receiving the shank corresponded regularly to the diameter of the depression to be formed in the shape to be manufactured, this is now not the case. Rather, the corresponding shank dimensions are decreased compared to those of the surface depressions to be produced transversely to the longitudinal direction to the shank. As a consequence the insert in contact with the mold portion covers the shank recess in the orifice region of the mold chamber and, additionally, laterally projects beyond it, i.e. transversely to the longitudinal direction of the shank so that it becomes impossible that casting respectively foaming material penetrates into the shank opening. It is true that here, too, it cannot always be prevented that in the contact region between the wall of the mold portion surrounding the orifice of the shank opening and the facing surface of the insert a certain amount of the material to be worked penetrates. However, this is harmless, since the mold marks respectively edges originating here are automatically separated in the ejection process. Because during ejection the particular mold insert is pulled out of the formed shape in the longitudinal direction of the shank so that the mold marks projecting transversely to the ejection direction into the mentioned interspace are directly broken off. Reworking of the generated surface depression, therefore, can be omitted which decreases the manufacturing costs of the adapter blocks considerably.

The fastening shank and the insert are preferentially cylindrical and are arranged coaxially with the diameter of the shank respectively the recess of the mold portion receiving it being smaller than that of the insert. Such inserts can be produced more cost-efficiently due to their simple geometric shape and, in particular, are suited for ejecting connecting channels in the given adapter mold block. The front face of the insert on the axial side annularly surrounding the shank in the region of the gradation usefully extends in a plane arranged at a right angle to the longitudinal axis of the shank. This ensures that this front face can rest full and flush on the corresponding facing mold surface. If necessary, this axial front face of the insert can also be conical so that between the insert and the mold portion an edge of precisely defined shape can originate which can readily be broken off after the molding process. To this end the annular surface arranged in the region of the gradation and connecting the shank circumference with the insert circumference is formed in the manner of the surface area of a truncated cone widening toward the insert.

The channel forming projection and the insert are arranged with at least one surface of the projection adjacent to at least one surface of the insert. The projection and the insert upon their ejection create hollow spaces inside the material, which upon the completion of the molding and subsequent attaching process form an adapter block with internally intersecting channels.

Depending on the form of the shape to be produced, one or more inserts can be used having a projection of any shape. It is in each instance of advantage to produce the insert and the fastening shank of synthetic material and to cast it respectively inject it of a thermoplastic synthetic material.

For secure fastening of the inserts on the particular mold portion it is usefully provided to arrange on the side of the fastening shank opposing the insert an anchoring part which fixes the mold insert on the associated mold portion and secures it against being pulled out in particular in the direction of the mold chamber. This can be, in particular, a cylindrical part which advisably has a greater width transversely to the longitudinal direction of the shank at least in one site than the corresponding width respectively the corresponding diameter of the opening receiving the shank. Optimum fastening is now achieved through the part of the mold portion disposed in the inserted stage of the insert between the projection and the anchoring part. The anchoring part can preferentially be inserted firmly in the negative mold portion, it is, however, also possible to arrange the anchoring part on the outside of the mold portion.

Flexibility of the manufacture of shapes can be increased if the insert and the shank as well as additionally or alternatively the shank and the anchoring part are detachably connected with each other, for example by being screwed together. In that case, the individual mold parts can be rapidly exchanged and the form of the shapes to be produced can be varied.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
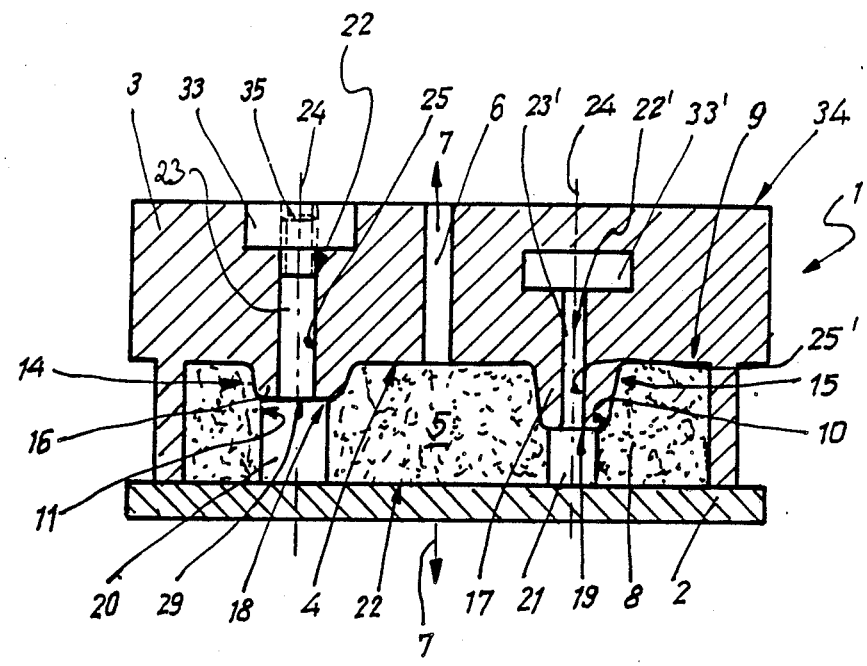
FIG. 1 is a first embodiment of the negative mold in longitudinal section, with the adapter shape to be produced being indicated by the dotted area.

The negative mold 1 shown in the drawing in the closed state contains a plate-shaped mold portion 2 and a second mold portion 3 which in the present embodiment will be referred to as mold halves 2 and 3 practically forming the cover of the negative mold 1. On its contour side 4 facing the plate-shaped mold half 2 the second mold half 3 contains a spared region which is covered by the other mold half 2 so that a mold chamber 5 originates. Into this empties a filling channel 6 penetrating the mold half 3 through which the material to be shaped, for example a liquid or a material to be foamed, can be injected into the mold chamber 5. After curing respectively foaming of the injected plastic substance the two mold halves 2 and 3 are separated from each other as indicated by arrow 7 and the produced shape can be removed. This process is called forming out respectively (deforming) ejecting.

The negative mold according to the invention functions in particular for the manufacture of shapes, consisting of plastic, from which adapter blocks used in fluid technology can be put together. These adapter blocks contain interior channels respectively chambers which represent a pneumatic circuit and are arranged accordingly. This permits dispensing with confusing hose connections which are also susceptible to disturbances, and it becomes possible to dispose pneumatic circuits compactly in an extremely small space.

In order to obtain the interior channels of the adapter block, first, a shape is produced with the negative mold according to the invention. Such shape is referred to by the number 8 in FIG. 1 and is located in the mold chamber 5 (dotted representation). The structure of mold part 8 is essentially plate-shaped or block-shaped with depressions 10 and 11 being the result of the preceding casting and foaming process in which on the contour side 4 of the raised parts 14 and 15 arranged on the contour side 4 of the one mold half 3 which have formed with their shape the negative for these depressions. Stated in another way, this means that the topography of the contour side 4 in the negative corresponds to that of the facing connecting surface 9 of mold part 8 after completion of the manufacturing process.

After ejecting mold part 8 its connection surface 9 is covered which can take place by gluing a plate body or another shape onto it. Depressions 10 and 11 are thereby covered and suitable for carrying a fluid medium.

The raised parts 14 and 15 in the embodiment shown in the illustration are rib-shaped parts 16 and 17 formed onto the contour side 4 of the mold half 3 which essentially extend at a right angle to the plane of projection of the view and due to the representation in section appear hump-shaped. The surface segment 18 and 19 of structured-on parts 16 and 17 pointing to the opposing mold half 2 is at least on one site, in the embodiment in the section plane, flattened and is in contact with one mold insert 20 and 21 which likewise is part of the particular raised part 14 and 15. The mold inserts 20 and 21 extend up to the opposing mold half 2 and forms so the negative for connecting channels which empty, on the one hand, on the connecting surface 22 opposing the connecting surface 9 and, on the other hand, into a channel of the mold part 8 shaped by the structured-on parts 16 and 17.

The inserts 20 and 21 are in each instance part of a mold body or core 22 and 22', which is anchored in on the mold half 3 by respective fastening shank 23 and 23' of the body or core 22 and 22' integrally connected to respective inserts.

In the embodiment the inserts 20 and 21 as well as also the fastening shanks 23 and 23' of the cores 22 and 22' are cylindrical and arranged coaxially to each other with the longitudinal direction 24 extending parallel to the ejecting direction 7. The shank 23 and 23' is inserted in a corresponding respectively complementary opening or recess 25 and 25', with the transition region 29 to the mold inserts 20 and 21 being assigned to the surface segments 18 and 19 of mold half 3.

The transition from the fastening shank 23 and 23' to the inserts 20 and 21 is, according to the invention, graded, i.e. formed as gradation 30 so that the insert 20 and 21, in contact with the mold half 3, completely covers the orifice of the opening 25 and 25' containing the associated shank 23 and 23' and additionally still project beyond the edge of opening 25 and 25' respectively overlaps it. In the embodiment to this end the diameter of the opening 25 and 25' receiving the particular shank is less than that of the associated insert 20 and 21.

Fastening shank 23 and 23' and mold part 20 and 21 can also have a shape other than cylindrical, however, it is essential in each case to ensure that the surface of the mold part in the transition region 29, viewed without the particular shank, is greater than the cross sectional area of the opening receiving the shank in the orifice region and the particular orifice is completely covered.

Figure 2:
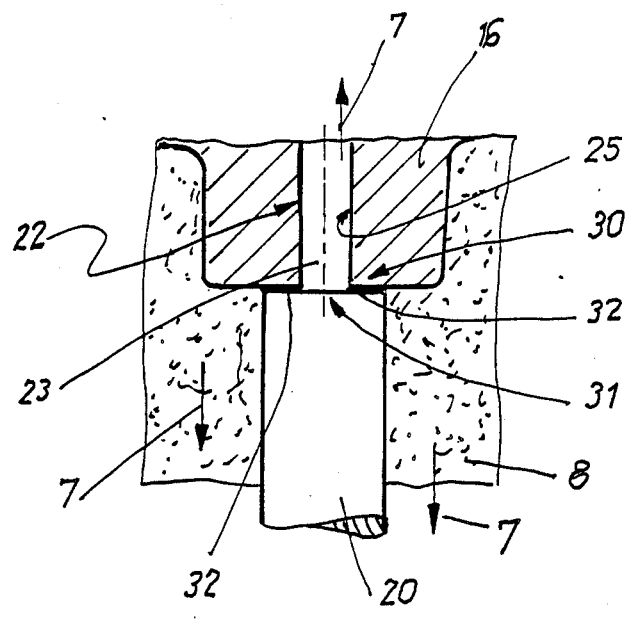
FIG. 2 is an enlarged detail view of the transition region between insert and fastening shank.

The advantages of this design are evident in particular in FIG. 2 in which identically corresponding structural parts have identical reference numbers. Thus, according to the invention, the shank opening 25 in the orifice region 31 is covered by the insert 20 so that no plastic material used in the manufacturing process can penetrate into the opening 25. Thus, the formation of mold marks which would require subsequent reworking is counteracted. Should plastic material, nevertheless, penetrate (which cannot always be precluded) into the annular-shaped contact region 32 between insert 20 and 21 and the structured-on part 16 and 17, this then is entirely harmless. Since the penetrated material after hardening projects transversely to the ejection direction 7 into the contact region 32, the thus generated mold mark is automatically separated from the mold part 8 already during ejection along arrow 7. The surface of the depressions 10 and 11 can be kept entirely free of molding marks so that costly reworking steps in particular polishing or similar become unnecessary.

Figure 3:
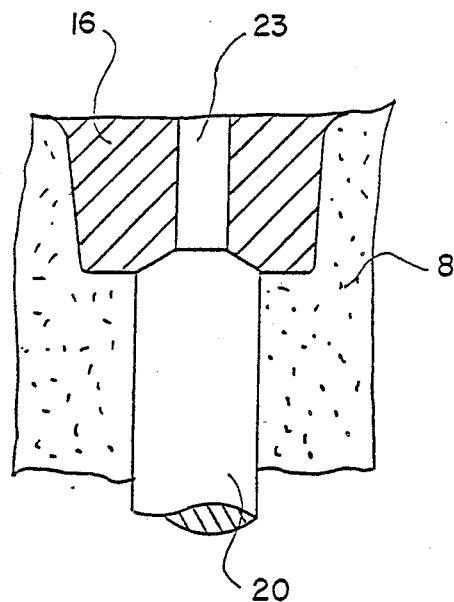
FIG. 3 is an enlarged detail view of another embodiment of the mold construction showing the transition region as a truncated cone.

In the embodiment shown in FIGS. 1 and 2 the contact surface 32 extends in a plane arranged at a right angle to the longitudinal axis of the shank, however, if it is necessary, a slightly conical course can be chosen as shown in FIG. 3. In particular, it is possible of provide the annular surface of the insert 20 and 21 facing the structured-on part 16 and 17 with the shape of a surface area of a truncated cone whose diameter increased in the direction away from the shank.

In the embodiment the mold bodies consist of plastic material and are, in particular, parts produced of a thermoplastic synthetic material by injection molding or casting. Metallic materials can, however, also be used.

To support a secure fastening of the mold bodies 22 and 22' in the assigned mold half 3, it can be provided as shown in FIG. 1 to make available on the particular fastening shank 23 and 23' on the side opposing the mold part 20 and 21 an anchoring part 33 and 33'. This is preferentially a cylindrical disk-shaped part whose diameter is greater than that of the shank opening and the shank so that the mold bodies are secured against being pulled out in the direction toward the opposing mold half. Other designs of the anchoring part are possible also, for example, web respectively beam-shaped.

In the mold body 22' shown in the right-hand side of FIG. 1 the mold insert 21, shank 23', and anchoring part 33' are made of one piece. The anchoring part 33' is nondetachably embedded in the material of mold half 3. In contrast, the anchoring part 33 of the left mold body 22 is a separate structural part which, in addition, is detachably connected with shank 23. It sits in a depression of the mold half surface 34 opposing the contour side 4 and has a threaded bore into which the end of shank 23 provided with threads 35 is detachably screwed in. The latter permits exchanging the insert 20 so that mold parts 8 having different contours can be cast respectively foamed. It is also possible, additionally or alternatively, to form the particular shank 23 and 23' and the associated insert 20 and 21 as separate detachably connected structural parts and, in particular, such that can be screwed together.

It is clear that the invention can also be realized if the corresponding mold portion 3 has no rib-shaped structured-on parts 16 and 17. It is still essential that the insert on the front face on the shank side is so formed that it completely covers the opening receiving the associated shank with an edge region surrounding the orifice 31.

While specific embodiments of the invention have been shown and described in detail to illustrate the application of the principles the invention, it will be understood that the invention may be embodied otherwise without departing from such principles.

What is claimed:

1. A mold construction comprising: a first mold portion, and a second mold portion, said first and second mold portions enclosing a mold chamber, at least one of said mold portions being provided with at least one mold core protruding into said chamber, said at least one mold core having an end face, said at least one of said mold portions having at least one recess open to said end face, each of said at least one mold core comprising a shank and an insert, at least one shank being in said at least one recess, said shank having a first end and a second end said at least one mold core with at least part of its end face abutting said at least one mold portion in an abutting region surrounding said at least one recess and fastened to said second end of said shank, said shank being connected to said at least one mold portion in a way that the at least one mold core is secured against being pulled away in the direction toward the opposing of said first and second mold portions seen during ejection of a mold part molded in said mold chamber.

2. A mold construction according to claim 1, wherein said mold insert and said shank are connected in a transition region, said transition region formed as a gradation which widens toward said insert.

3. A mold construction according to claim 1, wherein said shank and said insert are both cylindrical and arranged coaxially.

4. A mold construction according to claim 1, wherein said end face of said mold core extends in a plane which is at a right angle to the longitudinal axis of said shank.

5. A mold construction according to claim 1, wherein said end face of said mold core is in the shape of a truncated cone widening away from the mold part.

6. A mold construction according to claim 1, wherein said at least one insert and said at least one shank are made of a plastic material, said plastic material is a shape injected or cast of a thermoplastic synthetic material.

7. A mold construction according to claim 1, wherein said at least one insert and said at least one shank are integrally formed as one piece.

8. A mold construction according to claim 1, wherein said a least one shank is connected to said at least one mold portion by an anchoring portion and said at least one shank and said at least one anchoring portion are integrally formed as one piece.

9. A mold construction according to claim 1, wherein said at least one shank is connected to said at least one mold portion by an anchoring portion and said at least one insert and said at least one shank and said at least one anchoring portion are formed as one piece.

10. A mold construction according to claim 1, wherein said shank is connected to said at least one mold portion by an anchoring portion which is a cylindrical part which is wider in at least one site than the corresponding diameter of said at least one recess.

11. A mold construction according to claim 10, wherein said at least one anchoring portion is embedded in said mold portion.

12. A mold construction according to claim 1, wherein said at least one mold insert and said at least one shank have at least one detachable connection.

13. A mold construction according to claim 12, wherein said at least one detachable connection is in the form of corresponding screw threads.

14. A mold construction according to claim 1, wherein said at least one shank is connected to said at least one mold portion by an anchoring portion and said at least one shank and said at least one anchoring portion have at least one detachable connection.

15. A mold construction according to claim 14, wherein said at least one detachable connection is in the form of corresponding screw threads.

16. A negative mold for molding a plastic material comprising first and second mold halves movable together and apart along a mold axis between closed and open conditions, defining a mold chamber when in the closed condition; a mold core comprising a shank portion and an insert portion; a socket formed in one mold half and having a mouth opening into the mold chamber with a socket mouth axis extending in the same direction as the mold axis; the shank portion being anchored in the socket for movement of the core by the one mold half insert portion projecting from the socket and axially across the chamber towards the other mold half, the cross-sectional profile of the insert portion transversely of the mold axis at a location adjacent the junction with the shank portion being greater than the cross-sectional size of the mouth of the socket and of the shank portion thereby defining a shoulder on the insert portion which overlaps the lip of the mouth in all directions transverse of the socket axis covering the mouth completely whereby an mold material entering between the shoulder and the lip of the bore edges will be broken off by the insert portion shoulder on moving the mold halves apart to the open condition.

* * * * *